US012608941B2

(12) United States Patent
Sugita et al.

(10) Patent No.: US 12,608,941 B2
(45) Date of Patent: Apr. 21, 2026

(54) VIDEO DISCRIMINATION DEVICE, VIDEO DISCRIMINATION SYSTEM, AND STORAGE MEDIUM

(71) Applicant: FANUC CORPORATION, Yamanashi (JP)

(72) Inventors: Yuuki Sugita, Yamanashi (JP); Nobuaki Aizawa, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 303 days.

(21) Appl. No.: 18/556,675

(22) PCT Filed: Jan. 21, 2022

(86) PCT No.: PCT/JP2022/002289
§ 371 (c)(1),
(2) Date: Oct. 23, 2023

(87) PCT Pub. No.: WO2022/244306
PCT Pub. Date: Nov. 24, 2022

(65) Prior Publication Data
US 2025/0095367 A1 Mar. 20, 2025

(51) Int. Cl.
*G06V 20/40* (2022.01)
*G05B 19/4063* (2006.01)

(52) U.S. Cl.
CPC ......... *G06V 20/47* (2022.01); *G05B 19/4063* (2013.01)

(58) Field of Classification Search
USPC ........................................................ 386/241
See application file for complete search history.

(56) References Cited

U.S. PATENT DOCUMENTS

| | | | | |
|---|---|---|---|---|
| 11,012,737 | B1* | 5/2021 | Carney Landow | .......................... H04N 21/4394 |
| 2007/0253680 | A1* | 11/2007 | Mizote | ............... H04N 21/4884 386/230 |
| 2014/0267645 | A1* | 9/2014 | Wexler | .................... G06V 20/20 348/62 |
| 2017/0070361 | A1* | 3/2017 | Sundermeyer | ........ H04L 67/025 |
| 2017/0235848 | A1* | 8/2017 | Van Dusen | ........ G06Q 30/0201 705/12 |
| 2019/0200099 | A1* | 6/2019 | Misra | .................... H04N 21/814 |
| 2022/0366292 | A1* | 11/2022 | Uejima | ............... G06Q 10/087 |

FOREIGN PATENT DOCUMENTS

| | | |
|---|---|---|
| JP | S63-065511 A | 3/1988 |
| JP | H02-093898 A | 4/1990 |
| JP | H08-129411 A | 5/1996 |
| JP | 2005-033303 A | 2/2005 |
| JP | 2005-209024 A | 8/2005 |

(Continued)

*Primary Examiner* — Nigar Chowdhury
(74) *Attorney, Agent, or Firm* — HAUPTMAN HAM, LLP

(57) ABSTRACT

This video discrimination device: stores a machine state dictionary linking identification information for data pertaining to the state of a machine, which is a numerical control device and/or a machining tool, and the contents of the data; acquires video of the machine; acquires data to be used in detecting a change in the state of the machine; determines whether the state of the machine has changed, on the basis of the data; and links the contents of the data and video when the state of the machine has changed.

14 Claims, 11 Drawing Sheets

(56)        References Cited

FOREIGN PATENT DOCUMENTS

| JP | 2007-011532 | A | 1/2007 |
| JP | 2016-039473 | A | 3/2016 |
| WO | 2020/157927 | A1 | 8/2020 |
| WO | 2021/019821 | A1 | 2/2021 |

* cited by examiner

Figure 1:
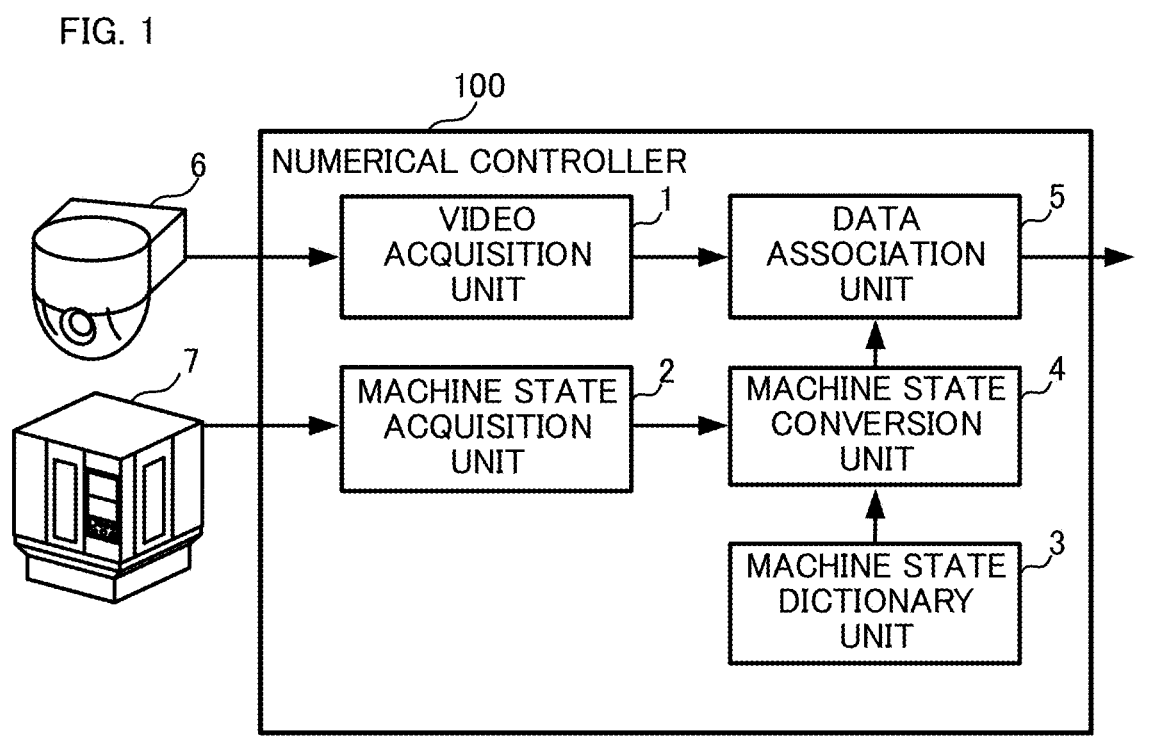

NUMERICAL CONTROLLER

6

7

| VIDEO ACQUISITION UNIT | 1 |

| DATA ASSOCIATION UNIT | 5 |

| MACHINE STATE ACQUISITION UNIT | 2 |

| MACHINE STATE CONVERSION UNIT | 4 |

| MACHINE STATE DICTIONARY UNIT | 3 |

FIG. 2

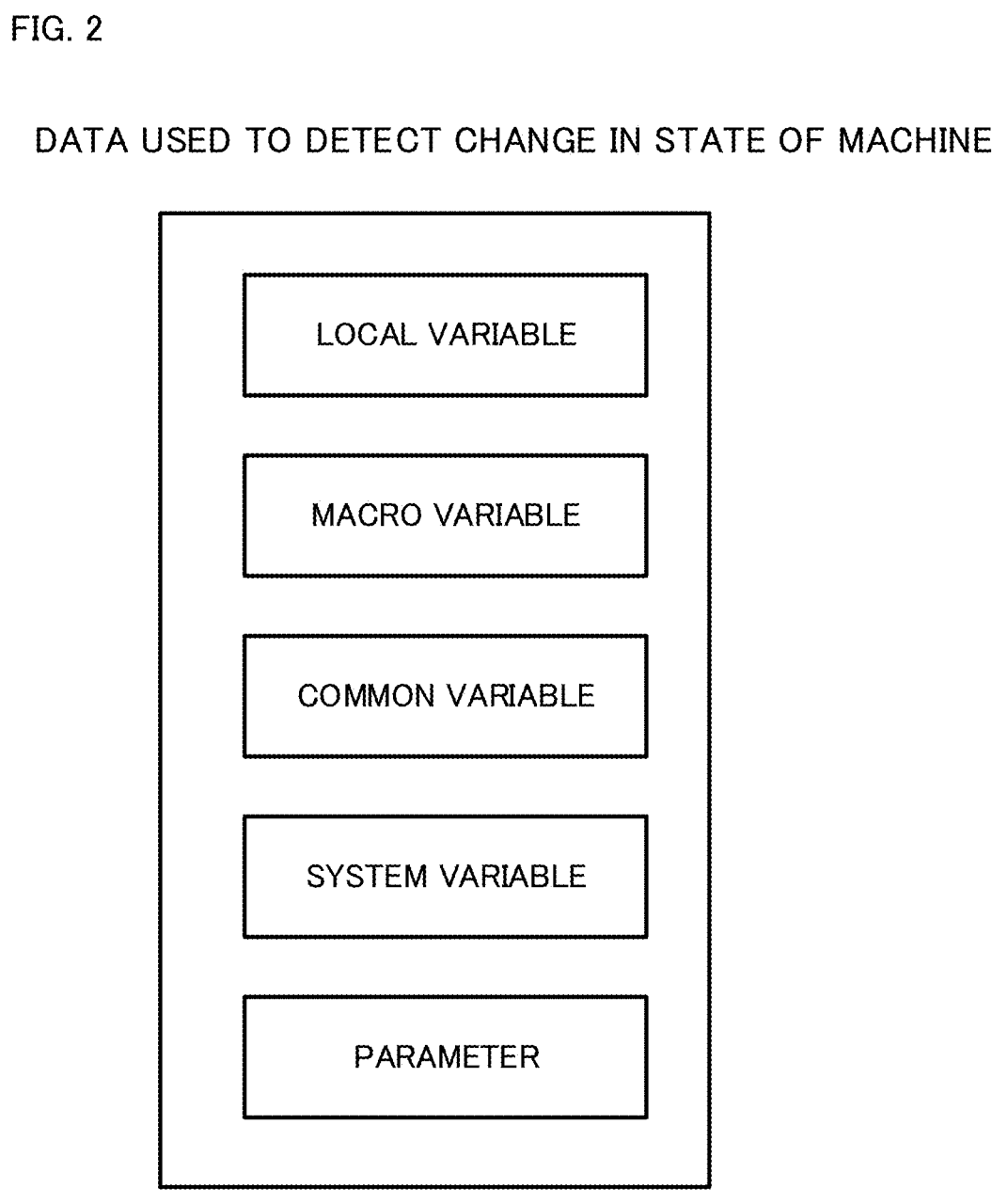

DATA USED TO DETECT CHANGE IN STATE OF MACHINE

LOCAL VARIABLE

MACRO VARIABLE

COMMON VARIABLE

SYSTEM VARIABLE

PARAMETER

SERVER

PLC

50

100

SENSOR/ACTUATOR AND
THE LIKE

SERVOMOTOR/FAN AND
THE LIKE

TOUCH PANEL

BUTTONS                    DIALS

FIG. 5

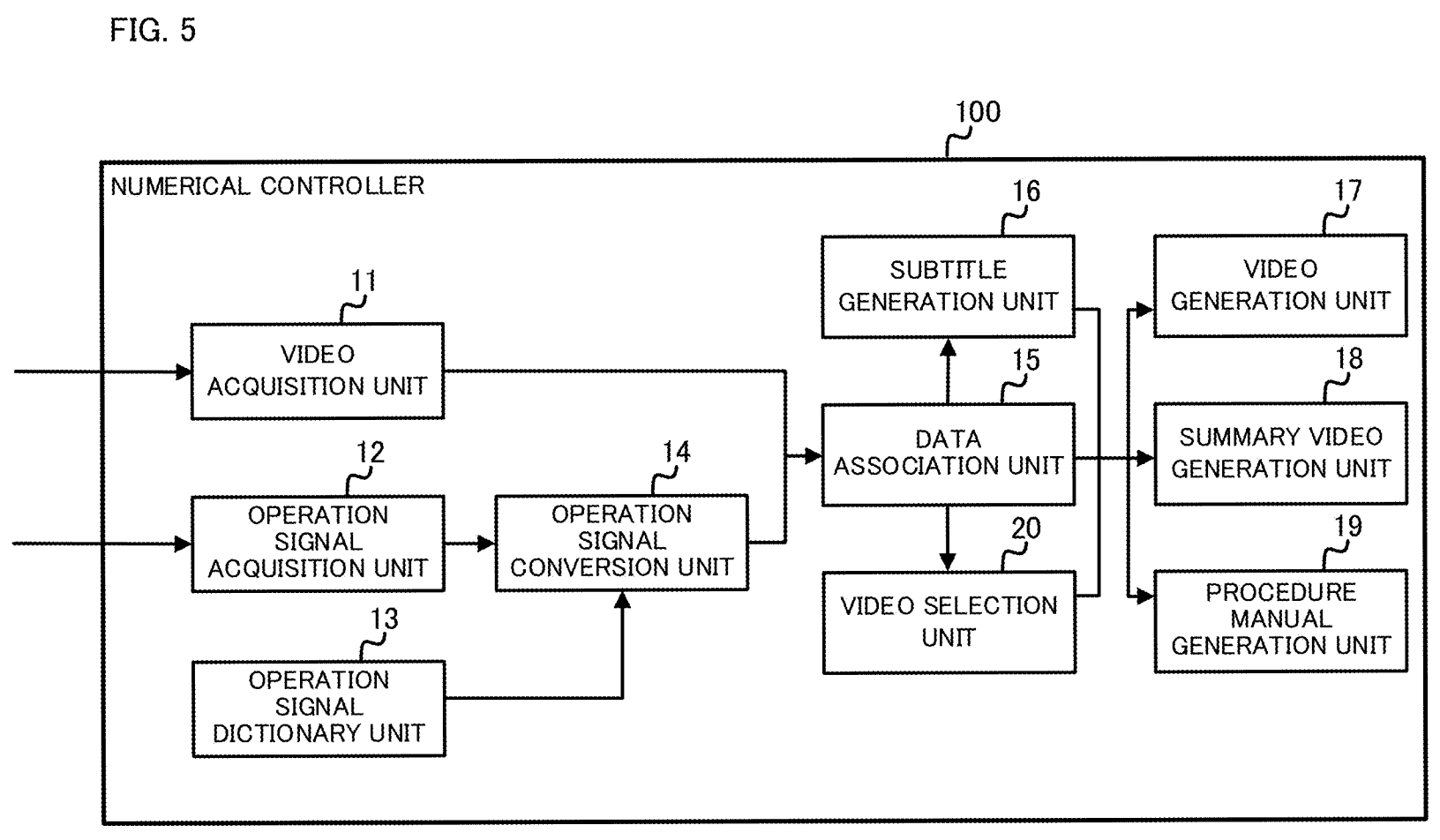

NUMERICAL CONTROLLER

100

17 — VIDEO GENERATION UNIT

18 — SUMMARY VIDEO GENERATION UNIT

19 — PROCEDURE MANUAL GENERATION UNIT

16 — SUBTITLE GENERATION UNIT

15 — DATA ASSOCIATION UNIT

20 — VIDEO SELECTION UNIT

14 — OPERATION SIGNAL CONVERSION UNIT

11 — VIDEO ACQUISITION UNIT

12 — OPERATION SIGNAL ACQUISITION UNIT

13 — OPERATION SIGNAL DICTIONARY UNIT

| OPERATION DATA (SIGNAL) | VALUE | CONVERTED DATA (TEXT) |
|---|---|---|
| SIGNAL 1 | 1 | MOVE IN +Y DIRECTION IN JOG |
| SIGNAL 2 | 10 | FAST-FORWARD OVERRIDE IS 25% |

KEY FRAMES

| OPERATION DATA (SIGNAL) | VALUE | CONVERTED DATA (PATH OF VIDEO OR VIDEO FILE) |
|---|---|---|
| SIGNAL 1 | 1 | +Y |
| SIGNAL 2 | 10 | ⃠ |

KEY FRAMES

SUMMARY VIDEO

KEY FRAMES

FIG. 14

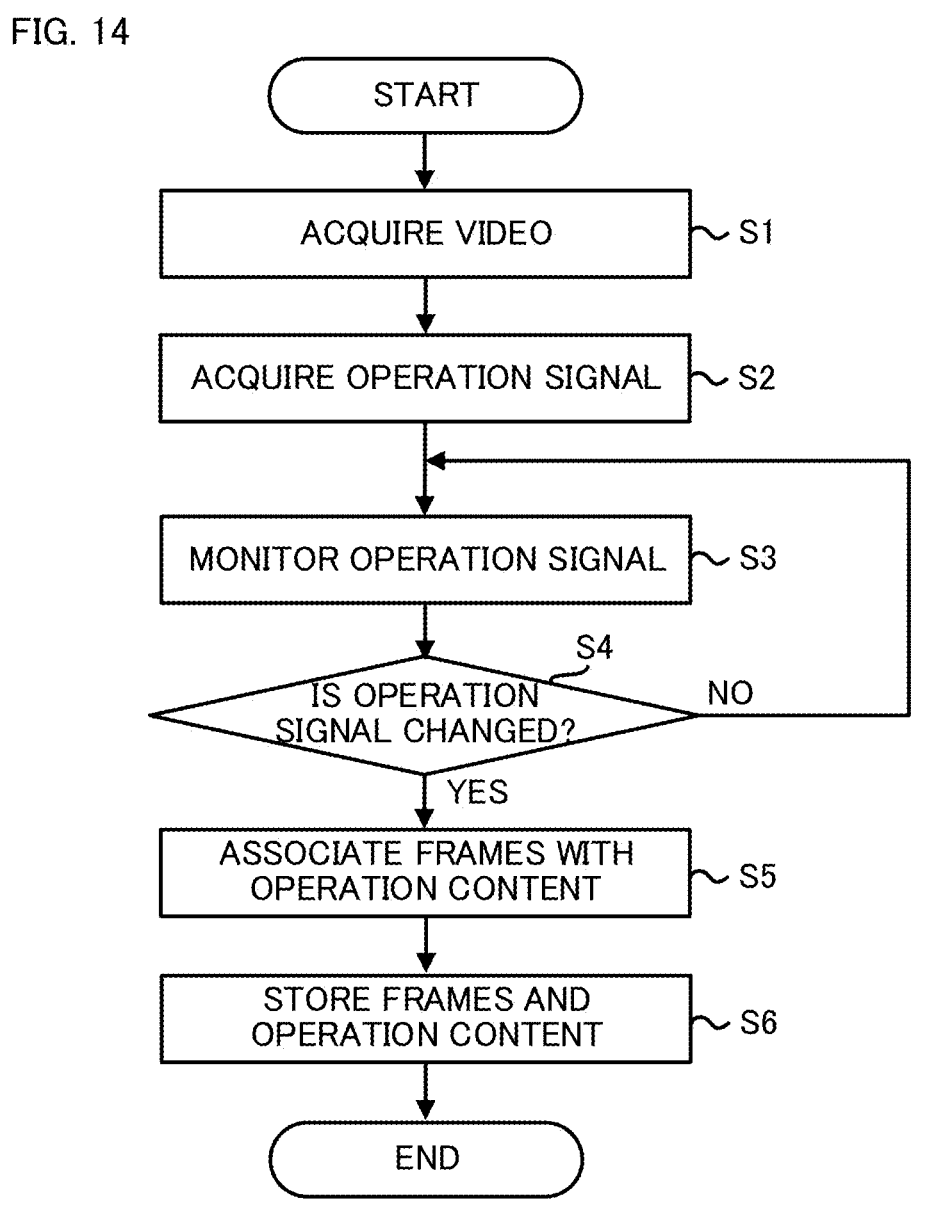

```
                    ┌──────────────┐
                    │    START     │
                    └──────┬───────┘
                           │
                           ▼
          ┌────────────────────────────────┐
          │         ACQUIRE VIDEO          │ ∼ S1
          └────────────────┬───────────────┘
                           │
                           ▼
          ┌────────────────────────────────┐
          │    ACQUIRE OPERATION SIGNAL    │ ∼ S2
          └────────────────┬───────────────┘
                           │ ◄─────────────────────────┐
                           ▼                           │
          ┌────────────────────────────────┐           │
          │    MONITOR OPERATION SIGNAL    │ ∼ S3      │
          └────────────────┬───────────────┘           │
                           │            S4             │
                           ▼                           │
                    ◇ IS OPERATION ◇   NO              │
                    SIGNAL CHANGED? ─────────────────────┘
                           │
                           │ YES
                           ▼
          ┌────────────────────────────────┐
          │   ASSOCIATE FRAMES WITH        │ ∼ S5
          │    OPERATION CONTENT           │
          └────────────────┬───────────────┘
                           │
                           ▼
          ┌────────────────────────────────┐
          │      STORE FRAMES AND          │ ∼ S6
          │    OPERATION CONTENT           │
          └────────────────┬───────────────┘
                           │
                           ▼
                    ┌──────────────┐
                    │     END      │
                    └──────────────┘
```

FIG. 16

VIDEO DISCRIMINATION DEVICE, VIDEO DISCRIMINATION SYSTEM, AND STORAGE MEDIUM

RELATED APPLICATIONS

The present application is a National Phase of International Application No. PCT/JP2022/002289 filed Jan. 21, 2022, which claims priority to International Application No. PCT/JP2021/018653 filed May 17, 2021.

TECHNICAL FIELD

The present invention relates to a video discriminator, a video discrimination system, and a computer-readable storage medium.

BACKGROUND ART

In the related art, there is an NC controller captured in multimedia to support manufacturing activities (repeat order) by reproducing a machine operation and setup for an individual product, or a product handling and inspection method, or the like as a video (Patent Literature 1).

Patent Literature 1 describes that "when the NC processing data is sent from an NC processing data host computer to the display control unit 20 via the RS-232C, the display control unit 20 downloads the NC processing data to the NC device and generates the index table 26 having a program name as an ID. When a barcode reading switch 13 such as "recording" or "setup" is operated from a barcode reader, the display control unit 20 starts a control software unit 21 and instructs the recording unit 22 to perform recording. Since the recording unit 22 returns a time code of the recording start to the control software unit 21 at a present time, the system writes the time code in a "setup process" field of the index table 26".

In Patent Literature 1, the NC processing data is downloaded to the NC device, and the index table 26 having the program name as an ID is generated. In the barcode reading switch 13, a plurality of code switches for each task which is a point, such as a "setup code" operated at the time of die set-up and a "bending code" pressed at the time of bending, are set. For example, when the "set-up code" is operated, the system writes the time code in the "setup process" field of the index table 26. The system manages the NC processing data (program) and the index table 26 as a pair and can search the reproduction unit 24.

CITATION LIST

Patent Literature

Patent Literature 1: JP 8-129411 A

SUMMARY OF INVENTION

Technical Problem

In Patent Literature 1, it is necessary to prepare a switch for starting recording of a video and a switch for selecting content to be recorded (setup, bending, and the like), and it is necessary for an operator to monitor a machine and to manually start recording and input recorded content.

In the field of machine tools, a technique for automatically determining a video is desirable.

Solution to Problem

According to an aspect of the present disclosure, a numerical controller includes: a machine state dictionary unit configured to associate identification information of data related to a state of a machine which is both or at least one of a numerical controller and a machine tool with content of the data; a video acquisition unit configured to acquire a video of the machine; a machine state acquisition unit configured to acquire data used to detect a change in a state of the machine; a machine state conversion unit configured to detect the change in the state of the machine based on the data and convert the change in the data into content of the data with reference to the machine state dictionary unit; and a data association unit configured to associate a video at a time point of the change in the state of the machine with content of the data.

According to another aspect of the present disclosure, a video discrimination system includes: a machine state dictionary unit configured to associate identification information of data related to a state of a machine which is both or at least one of a numerical controller and a machine tool with content of the data; a video acquisition unit configured to acquire a video of the machine; a machine state acquisition unit configured to acquire data used to detect a change in a state of the machine; and a data association unit configured to detect the change in the state of the machine based on the data and convert the change in the data into content of the data with reference to the machine state dictionary unit and to associate a video at a time point of the change in the state of the machine with content of the data.

According to still another aspect of the present disclosure, a storage medium stores a computer-readable instruction, and one or a plurality of processors performs the computer-readable instruction to perform: storing a machine state dictionary unit that associates identification information of data related to a state of a machine which is both or at least one of a numerical controller and a machine tool with content of the data; acquiring a video of the machine;

acquiring data used to detect a change in a state of the machine; determining whether the state of the machine has changed based on the data; and associating a video at a time point of the change in the state of the machine with content of the data.

Advantageous Effects of Invention

According to one aspect of the present invention, it is possible to automatically determine a video.

BRIEF DESCRIPTION OF DRAWINGS

FIG. 1 is a block diagram illustrating a numerical controller as a video discriminator according to a first disclosure.

FIG. 2 is a diagram illustrating each variable set on a memory of the numerical controller.

FIG. 3 is a conceptual diagram illustrating a relationship between the numerical controller and an external device.

FIG. 5 is a block diagram illustrating a numerical controller according to a second disclosure.

FIG. 14 is a flowchart illustrating an operation of the numerical controller.

FIG. 16 is a diagram illustrating a hardware configuration of the numerical controller.

DESCRIPTION OF EMBODIMENTS

First Disclosure

Figure 4:
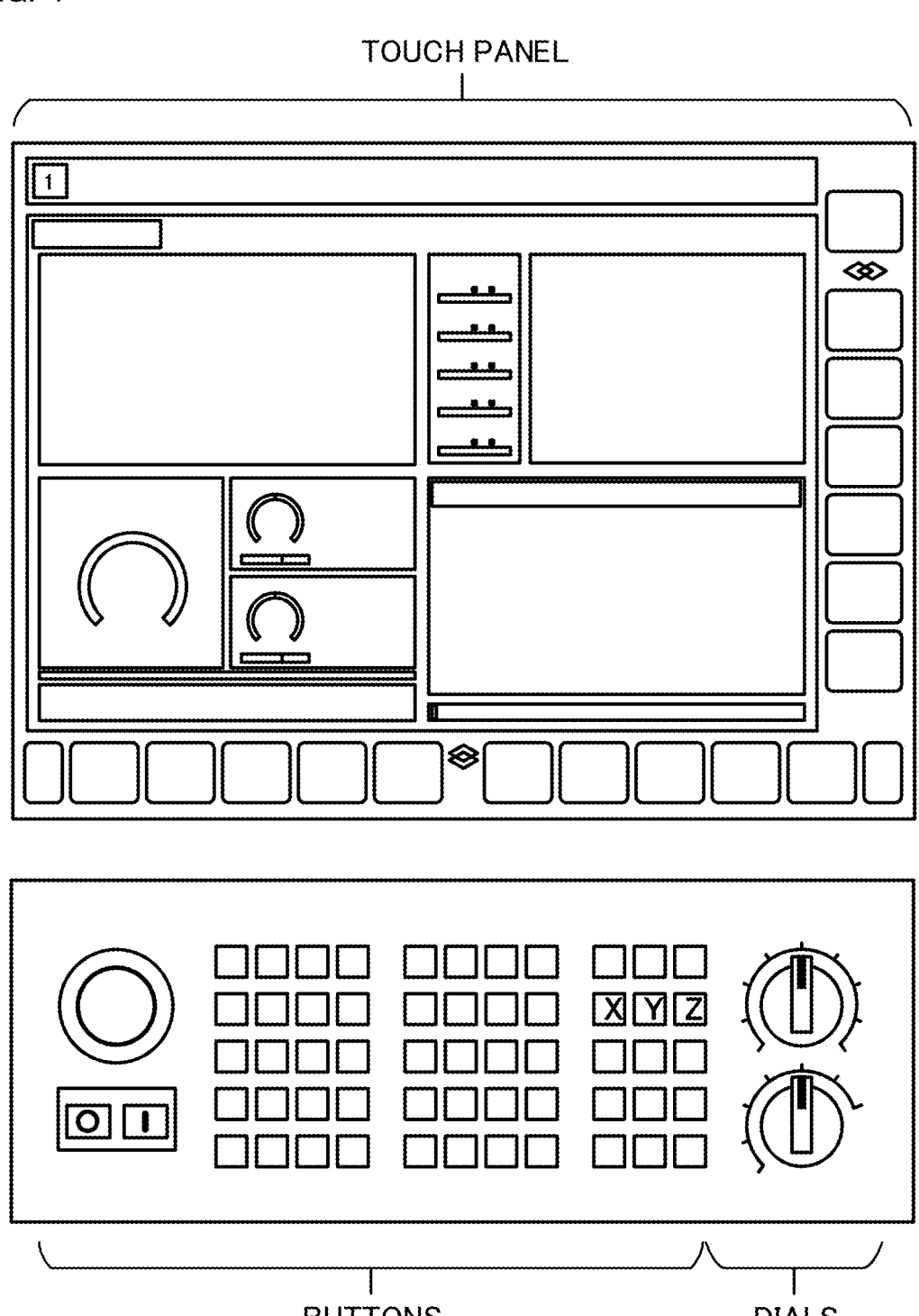
FIG. 4 is a diagram illustrating an example of an input unit.

FIG. 1 is a block diagram illustrating a numerical controller 100 as a video discriminator according to a first disclosure.

The numerical controller 100 includes a video acquisition unit 1, a machine state acquisition unit 2, a machine state dictionary unit 3, a machine state conversion unit 4, and a data association unit 5.

The video acquisition unit 1 acquires a video from the camera 6 imaging the machine tool 7 or a video obtained by imaging a display screen of the numerical controller 100 or the machine tool 7.

The machine state acquisition unit 2 acquires data used to detect the machine tool 7 and a change in a state of the numerical controller 100 that controls the machine tool 7 (hereinafter referred to as data used to detect a change in a state of a machine). Examples of "the data used to detect the change in the state of the machine" include an operation signal of a machine operation panel or a touch panel, a change in a variable by a processing program, a change in a variable from an embedded program, a change in a variable from a PC application, an input signal from an external device connected to a machine tool, an output signal to an external device connected to the machine tool, a processing program command, and a sequence program command.

The machine state dictionary unit 3 associates "the identification information of data used to detect a change in a state of the machine (for example, signal identification information/variable identification information/command identification information)" with "the content of data used to detect a change in a state of the machine (for example, signal content/variable content/command content)".

The machine state conversion unit 4 monitors "the data used to detect a change in a state of the machine" acquired by the machine state acquisition unit 2, and determines whether the state of the machine has changed. When the change in the machine state occurs, "the identification information of data" is converted into "the content of data" with reference to the machine state dictionary unit.

The data association unit 5 associates a change in the state of the machine with a video of the machine. Specifically, both or at least one of "the value of the data indicating the change in the state of the machine" and "the content of the data for changing the state of the machine" is associated with the video acquired by the video acquisition unit 1. The video acquired by the video acquisition unit 1 includes a video of the camera 6 that images the machine tool 7 and a video obtained by imaging the display screen of the machine tool 7.

A video associated with the data indicating the change in the state of the machine will be specifically described.

An operation signal of an operation panel, a touch panel, or the like can be "data used to detect the change in the state of the machine". The machine state conversion unit 4 monitors the operation signal. When the operation signal changes, "the content of data" of the changed operation signal is read with reference to the machine state dictionary unit 3. The data association unit associates both or at least one of "the value of the data" and "the content of the data" with the video.

For example, when the operator manually operates a speed dial of the operation panel and the speed signal changes from "10 to 20", the data association unit 5 associates a video "a moving speed of a machine tool shaft changes", content "speed" of the data, with a value "10→20" of the data.

For example, when a processing start signal changes from OFF to ON when a "processing start button" on the touch panel is pressed, the data association unit 5 associates a video "processing of workpiece starts" with content of data "processing starts".

When "processing program editing" is performed through a manual operation on the touch panel, the machine state conversion unit 4 detects a block (row) in which the processing program has changed. For example, when the 100th line of the processing program changes, the data association unit 5 associates a video "the operator operates the touch panel" and content of data "a change in the processing program" with a value of the data "the 100th line".

When "parameter editing" is performed through manual operation of the touch panel or the operation panel, a transmission speed parameter changes. The data association unit 5 associates a video "the operator operates the touch panel or the operation panel", the content of the data "feed speed parameter", and a value of the data "100→200" with each other.

When "editing of offset" is performed through a manual operation of the touch panel or the operation panel, the variable of the tool offset changes. The data association unit 5 associates the video "the operator operates the touch panel or the operation panel", the content of the data "tool offset", and a value of the data "100 mm→110 mm" with each other.

When the processing program for measuring the tool length is performed, "the variable of the tool offset automatically changes". The data association unit 5 associates a video "the processing program for measuring a tool length is executed and a measurement result is reflected in the offset", content of the data "tool offset", and a value of the data, for example, "100 mm→110 mm" with each other. The video "the measurement result is reflected in the offset" may be a captured video of the display unit 70 of the numerical controller 100.

When a processing program for automatically changing a macro variable is executed, "the macro variable automatically changes". For example, when a processing program measuring the shape of the workpiece is executed, the macro variable of the shape of the workpiece automatically changes. The data association unit 5 associates a video "execution of workpiece measurement", a video "a measurement result is reflected in a macro variable", content of data "workpiece shape", and a value of data, for example, "X120.0→X124.0" with each other. The video "the measurement result is reflected in the macro variable" may be, for example, a captured video of the display unit 70 of the numerical controller 100.

When the embedded program changing a variable is executed, "a certain variable automatically changes". For example, when "a processing program number to be executed" which is one of the variables is changed, the data association unit 5 associates the video "the processing program number is changed", content of the data "the processing program number to be executed", and a value of the data "the processing program number" with each other. The video "the processing program number is changed" may be a captured video of the display unit 70 of the numerical controller 100.

An application of an external information device may change the variable of the numerical controller 100. Here, the external information device is a personal computer (PC), a server, or the like.

For example, when "the processing program number to be executed" is changed as a variable, the data association unit associates the video "the processing program number is changed", the content of the data "the processing program number to be executed", and the value of the data "the processing program number" with each other.

Here, as the content of the data associated with the video, "a name of an application executing the change in the variable", "a name of the external information device executing the change in the variable", and the like can also be used. The video "the processing program number is changed" may be a captured video of the display unit 70 of the numerical controller 100.

An input signal from the external device connected to the machine tool 7 can be "data used to detect a change in a state of the machine". For example, the "touch signal of a touch probe" is the "data used to detect the change in the state of the machine". When the touch probe which is an external device comes into contact with a workpiece or the like, the "probe contact signal" changes to "ON". When the "probe contact signal" changes, the data association unit 5 associates a video "a light-emitting diode (LED) of the touch probe shines and stops" with content "touch probe contact" of the data.

An input signal from the sensor can be "the data used to detect the change in the state of the machine". For example, "a main axis temperature" detected by a temperature sensor is "the data used to detect the change in the state of the machine". When the "main axis temperature" exceeds a predetermined value, the data association unit 5 associates the content "main axis temperature" of the data, the value "main axis temperature value" of the data, and the video of the "main axis" with each other. When the temperature rises, the "main axis" may emit smoke.

An output signal to the external device connected to the machine tool 7 can be "the data used to detect the change in the state of the machine".

For example, "a door open/close signal of the machine tool" can be "the data used to detect the change in the state of the machine". When the "door open/close signal" changes, a PLC (PLC built in the numerical controller 100 or a PLC outside of the numerical controller 100) opens or closes a door in accordance with a value of a signal. The data association unit 5 associates a video of an external device with a change in data. For example, when "the door open/close signal" is turned on, the data association unit 5 associates a video "the door opens", content of the data "the door open/close signal", and a value of the data "OFF→ON" with each other.

"A coolant signal" can be "the data used to detect the change in the state of the machine". When "the coolant signal" changes, the PLC (the PLC built in the numerical controller 100 or the PLC outside of the numerical controller 100) ejects a coolant according to the value of the signal. The data association unit 5 associates the video of the external device with a change in data. For example, when "the coolant signal" is turned on, the data association unit 5 associates a video "coolant ejection starts", content of data "coolant signal", and a value of data "OFF→ON".

A command of the processing program can be "the data used to detect the change in the state of the machine". The numerical controller 100 analyzes the processing program and outputs a command to a module such as a servo amplifier. When the command is output, "a signal indicating a state of a specific function of the numerical controller 100" changes. The machine state conversion unit 4 determines that the state of the machine changes based on a change in a value of "the signal indicating the state of the specific function (for example, fast-forward or the like) of the numerical controller 100" (for example, switching between ON and OFF, or the like). The data association unit 5 associates a video "the specific function of the numerical controller 100 is used" with content of the data "for example, a fast-forward command or the like".

The command of the sequence program can be "the data used to detect the change in the state of the machine". The PLC inside the numerical controller 100 analyzes a sequence program and commands a specific sequence function to an external device connected to the numerical controller 100. When the command is output, "a signal indicating the state of the sequence function" changes. The machine state conversion unit 4 determines that the state of the machine changes based on a change (for example, switching between ON and OFF, or the like) in the value of the "signal indicating the state of the sequence function". The data association unit 5 associates a video "a command of the sequence program is executed" with the content of the data "for example, a tool exchange command or the like".

A method of detecting a change in the above-described "the data used to detect the change in the state of the machine" will be described.

In the numerical controller 100, variables such as a local variable, a macro variable, a common variable, and a system variable are set on a memory of the numerical controller 100, as illustrated in FIG. 2. Parameter numbers are also determined. The variable numbers or parameter numbers can be used as identification information of the data.

The local variable is a variable used when a processing program such as a main program or a macro program is executed, and is independent of the main program and the macro program. The common variable is a variable commonly used in the main program and the macro program.

The system variable stores change in tool diameter correction, reading of coordinate values, a valid command (G code), a valid M code (sequence command), and the like. The system variable includes an interface input signal, an interface output signal, setting data, and modal information.

A change in the machine state can be detected from values of these variables.

The numerical controller 100 according to the first disclosure detects a change in the state of the machine by monitoring the memory, the external signal, the operation signal, or the like, converts the identification information of the state of the machine into "content of data" with reference to the machine state dictionary unit 3, and associates the "the content of the data" with the video. Thus, the content of the video can be determined. An application example in which the video associated with "the content of the data" is used will be described in a second disclosure.

Second Disclosure

In the present disclosure, an embodiment in which association with a video is performed by particularly focusing on an operation of a numerical controller by an operator in a machine state will be described.

Figure 3:
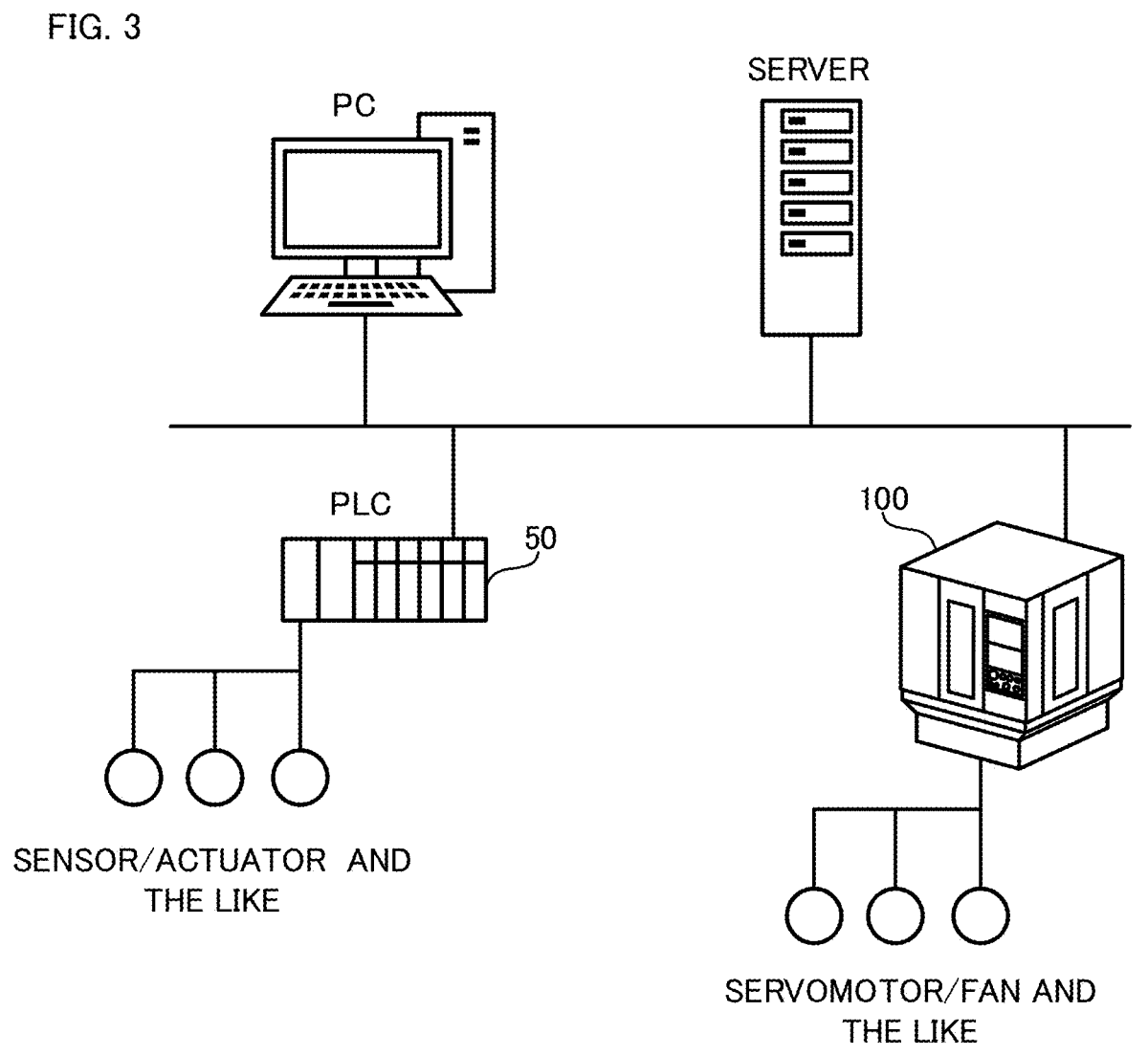

FIG. 3 is a conceptual diagram illustrating the numerical controller 100 as a video discriminator according to the present disclosure and a device that transmits a signal to the numerical controller 100. In FIG. 3, the numerical controller 100 is included in a machining center. The machining center is a device in which the numerical controller 100 and a machine tool are integrated. The machining center also includes devices such as a servomotor, a fan, a mist collector, a coolant, a chip removing device, an automatic tool changer (ATC), and a lamination display lamp (Patlite (registered trademark)). The numerical controller 100 includes an internal programmable logic controller (PLC) 42 and controls these devices.

The PLCs 42 and 50 include an internal PLC 42 built in the numerical controller 100 and an external PLC 50. In addition to a request from the numerical controller 100, the external PLC 50 inputs signals from equipment, devices, sensors, and actuators located at a manufacturing site, and outputs information detected by the sensors, control state data, and the like to the numerical controller 100. In the present disclosure, the devices controlled by the PLCs 42 and 50 are referred to as external devices of the numerical controller 100.

The numerical controller 100 includes an input unit 71. The input unit 71 includes a physical input unit 71 and an electronic input unit 71. FIG. 4 illustrates an example of the input unit 71 of the numerical controller 100. The physical input unit 71 includes dials, buttons, and the like of a machine operation panel. The electronic input unit 71 includes, for example, buttons displayed on a touch panel. When the operator operates the input unit 71, an operation signal is output via the PLC 42. This operation signal is not a special signal but a known operation signal obtained as a result obtained when the operator inputs an operation signal into the known input unit 71 of the numerical controller 100. In the present disclosure, a known operation signal is used for video discrimination. It is not necessary to input operation content of the operator, and a special switch or the like used for the operator to input the operation content is also unnecessary.

FIG. 5 is a block diagram illustrating the numerical controller 100. The numerical controller 100 includes a video acquisition unit 11, an operation signal acquisition unit 12, an operation signal dictionary unit 13, an operation signal conversion unit 14, a data association unit 15, a subtitle generation unit 16, a video generation unit 17, a summary video generation unit 18, a procedure manual generation unit 19, and a video selection unit 20.

The video acquisition unit 11 according to the present disclosure corresponds to the video acquisition unit 1 described in the first disclosure, the operation signal acquisition unit 12 according to the present disclosure corresponds to the machine state acquisition unit 2 described in the first disclosure, the operation signal dictionary unit 13 according to the present disclosure corresponds to the machine state dictionary unit 3 described in the first disclosure, the operation signal conversion unit 14 according to the present disclosure corresponds to the machine state conversion unit 4 described in the first disclosure, and the data association unit 15 according to the present disclosure corresponds to the data association unit 5 described in the first disclosure.

The video acquisition unit 11 acquires a video from a camera (not illustrated) that images a machine tool. The operation signal acquisition unit 12 acquires an operation signal input to the input unit 71 of the machine operation panel or the touch panel.

Figures 6, 7, 8:
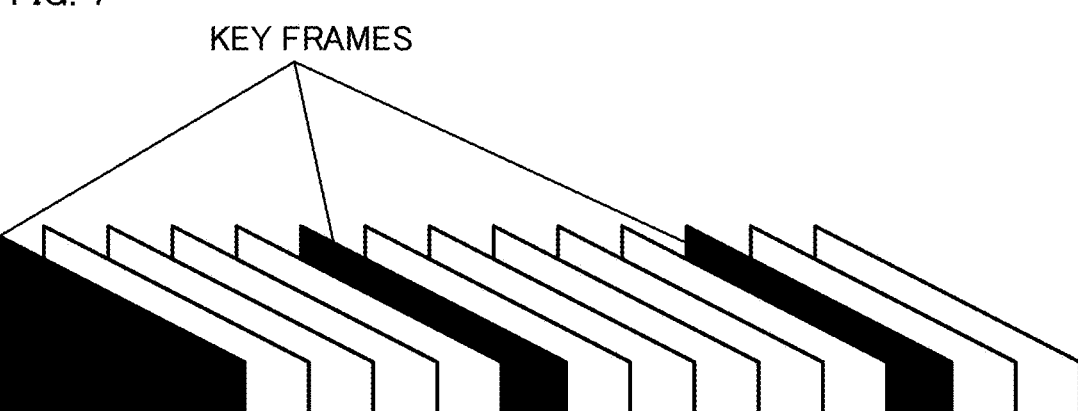
FIG. 6 is a diagram illustrating an example of an operation signal dictionary unit.
FIG. 7 is a diagram illustrating selection of a key frame.
FIG. 8 is a diagram illustrating an example of an operation signal dictionary unit.

The operation signal dictionary unit 13 associates a "signal", a "value of the signal", and "operation content" with each other. The operation signal conversion unit 14 can convert a change in a signal input to the numerical controller 100 into the operation content of the operator. FIG. 6 illustrates an example of the operation signal dictionary unit 13. In FIG. 6, "signal 1" and "signal 2" are registered as "signals". The "signal" includes an input address of an external device, and a voltage value of a predetermined resistor. In FIG. 6, a value "1" of "signal 1" is associated with the operation content "Move in +Y direction in JOG". A value "10" of "signal 2" is associated with operation content "fast-forward override is 25%".

The operation signal conversion unit 14 monitors an operation signal input to the input unit 71 and detects a change in the operation signal. The change in the operation signal includes a change in a value of the operation signal, an input of a new operation signal, and stop of the input of the operation signal. In the example in the first row of FIG. 6, when the value of "signal 1" changes from "0" to "1", a change in the operation signal is detected. The operation signal conversion unit 14 converts a change in the operation signal into the operation content "Move in +Y direction in JOG" with reference to the operation signal dictionary unit 13.

The data association unit 15 associates the operation content with the video. The data association unit 15 selects a video at a time point of a change in the operation signal as a key frame. The key frame is a frame serving as a delimiter of data included in a moving image. The key frame is an uncompressed frame that completely keeps video information. As illustrated in FIG. 7, the data association unit 15 selects a key frame at a time point of a change in the operation data among a plurality of frames and associates the key frame with the operation content.

The subtitle generation unit 16 generates subtitles indicating operation content at a time point of a change in the signal. As a method of generating subtitles, there is a method of generating a subtitle file. The subtitle file is a text file in which a display time of the subtitles is associated with text of the subtitles. The subtitle generation unit 16 adds the subtitle file to the video. A video, an audio, and subtitles may be multiplexed during video compression as in an MPEG transport stream. A method of generating the subtitles is not particularly limited.

Figure 9:
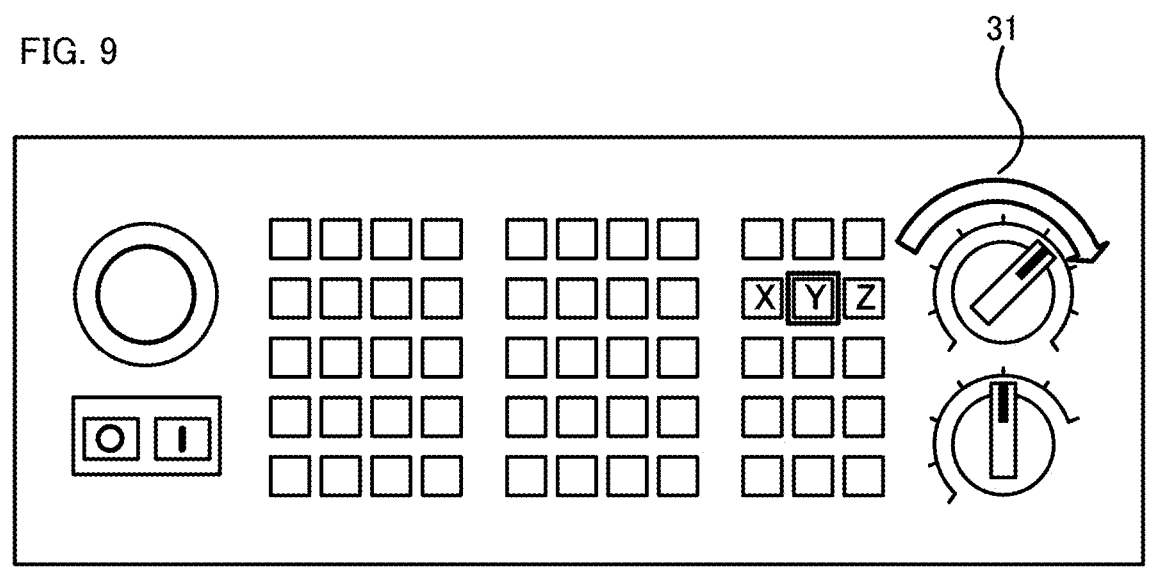
FIG. 9 is a diagram illustrating an example of a video generated by an operation video generation unit.

The video generation unit 17 converts the operation content into a video. FIG. 8 illustrates an example of the operation signal dictionary unit 13 when operation content is converted into a video. In FIG. 8, a value "1" of "signal 1" is associated with an operation content "+Y" button. A value "10" of "signal 2" is associated with the video of a dial operated counterclockwise. FIG. 9 illustrates an example of a video generated by the video generation unit 17. FIG. 9 illustrates pressing of the button "Y" and a dial operation as operation content. Specifically, the button "Y" is highlighted and displayed, an arrow indicating that the dial on the upper right of the machine operation panel is rotated is displayed, and an operation amount (value) of the dial is indicated. The video generation unit 17 converts the operation content of the operator into a video.

Figure 10:
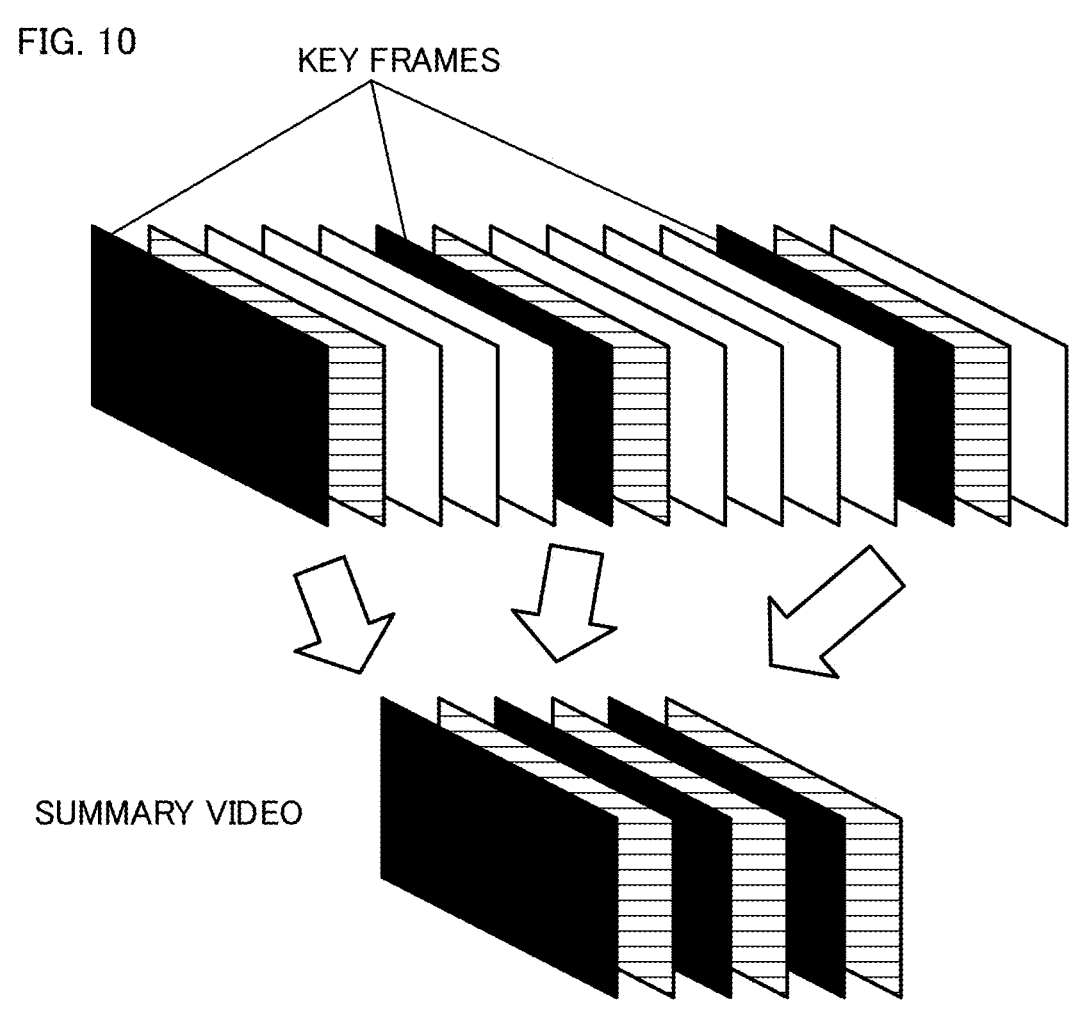
FIG. 10 is a diagram illustrating generation of a summary video.
Figure 11:
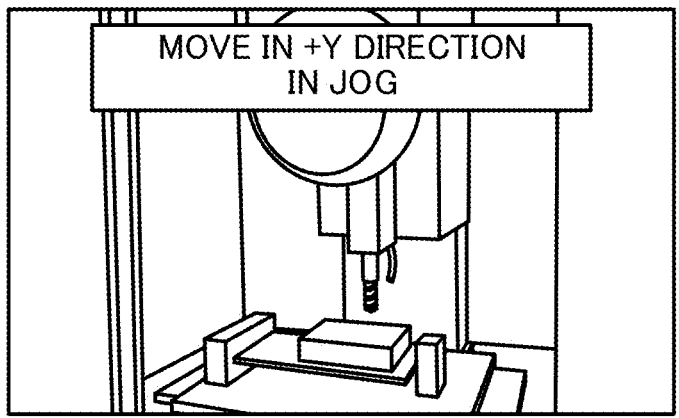
FIG. 11 is a diagram illustrating an example of a video with subtitles.

As illustrated in FIG. 10, the summary video generation unit 18 generates a summary video in which only portions where there is a change in the operation data are aggregated by extracting and connecting the key frames selected by the data association unit 15 and a video corresponding to subsequent several seconds. Subtitles may be added to the summary video. FIG. 9 illustrates an example in which subtitles are added to the summary video. In the example in FIG. 11, subtitles "Move in +Y direction in JOG" is attached. By attaching the subtitles, a relationship between an operation of the operator and movement of a machine tool can be visualized.

Figure 12:
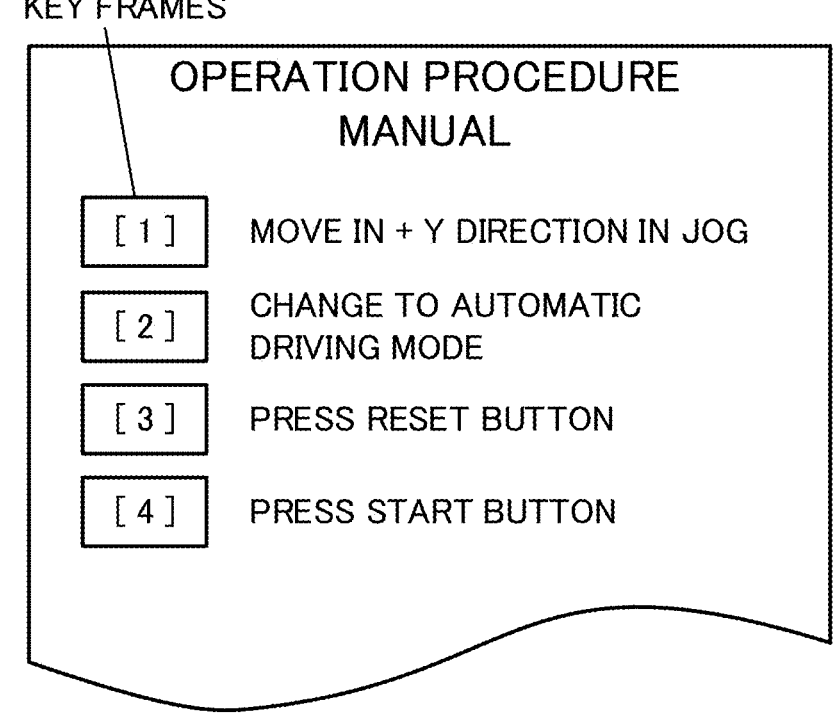
FIG. 12 is a diagram illustrating an example of an operation procedure manual.

The procedure manual generation unit 19 generates an operation procedure manual in which the video and the operation content have one-to-one correspondence by sequentially pasting the key frames and text indicating the operation content at that time to a document file. In the example of FIG. 12, four key frames of key frames [1], [2], [3], and [4] are arranged. The key frame [1] is a video when an operation of "Move in +Y direction in JOG" is performed, the key frame [2] is a video when an operation of "Change to automatic driving mode" is performed, the key frame [3] is a video when an operation of "Press reset button" is performed, and the key frame [4] is a video when an operation of "Press start button" is performed.

The procedure manual can be automatically generated by arranging operations of the operator chronologically. The operation procedure manual may include time information. The subtitles may be attached to the video.

The video selection unit 20 receives a selection of a representative video to be used for generating a summary video and generating a procedure manual. The video selection unit 20 displays a list of the key frames at the time point of the change in the signal, and receives a selection of the user. The summary video generation unit 18 generates a summary video from the key frames selected by the user. The procedure manual generation unit 19 generates a procedure manual from the key frames selected by the user.

Figure 13:
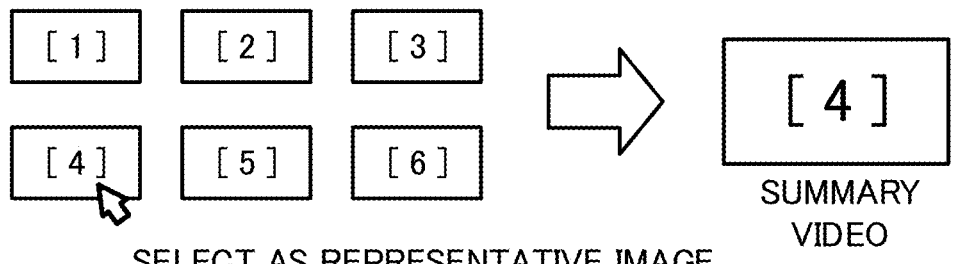
FIG. 13 is a diagram illustrating selection of a representative video.

The video selection unit 20 can also select the representative video. The representative video is used as a cover video of the summary video or the procedure manual. In the example of FIG. 13, a state in which when the key frame of [4] is selected as the representative video from the list of the key frames of [1] to [6], the summary video including the key frame [4] as a cover is generated is illustrated.

An operation of the numerical controller 100 will be described with reference to the flowchart of FIG. 14. In the present disclosure, the numerical controller 100 simultaneously records the video and discriminates the video. The numerical controller 100 acquires a video of a machine tool from a connected camera (step S1) and simultaneously acquires an operation signal (step S2).

The numerical controller 100 monitors the operation signal (step S3). When a change in the operation signal is detected (YES in step S4), operation content corresponding to the operation signal is selected with reference to the operation signal dictionary unit 13. When the change in the operation signal is not detected in step S4 (NO in step S4), the process proceeds to step S3 and the operation signal is monitored.

The numerical controller 100 selects frames of the video at the time point of the change in the operation signal as key frames and associates the key frames with the operation content (step S5). The key frames and the operation content are stored (step S6). At this time, a time stamp may be added.

The numerical controller 100 according to the present disclosure includes the operation signal dictionary unit 13 that associates an operation signal with operation content, and stores the operation content generated when the operator operates the numerical controller 100 in association with the key frames. The numerical controller 100 converts the operation content into a format such as text and video that can be understood by people. The numerical controller 100 displays text indicating the operation content as subtitles or displays the operation content as a video. The numerical controller 100 generates a summary video or generates a procedure manual using the operation content and the key frames. The user can also select key frames to be the cover of the summary video or the procedure manual. The operation content may be converted into an audio.

Third Disclosure

Figure 15:
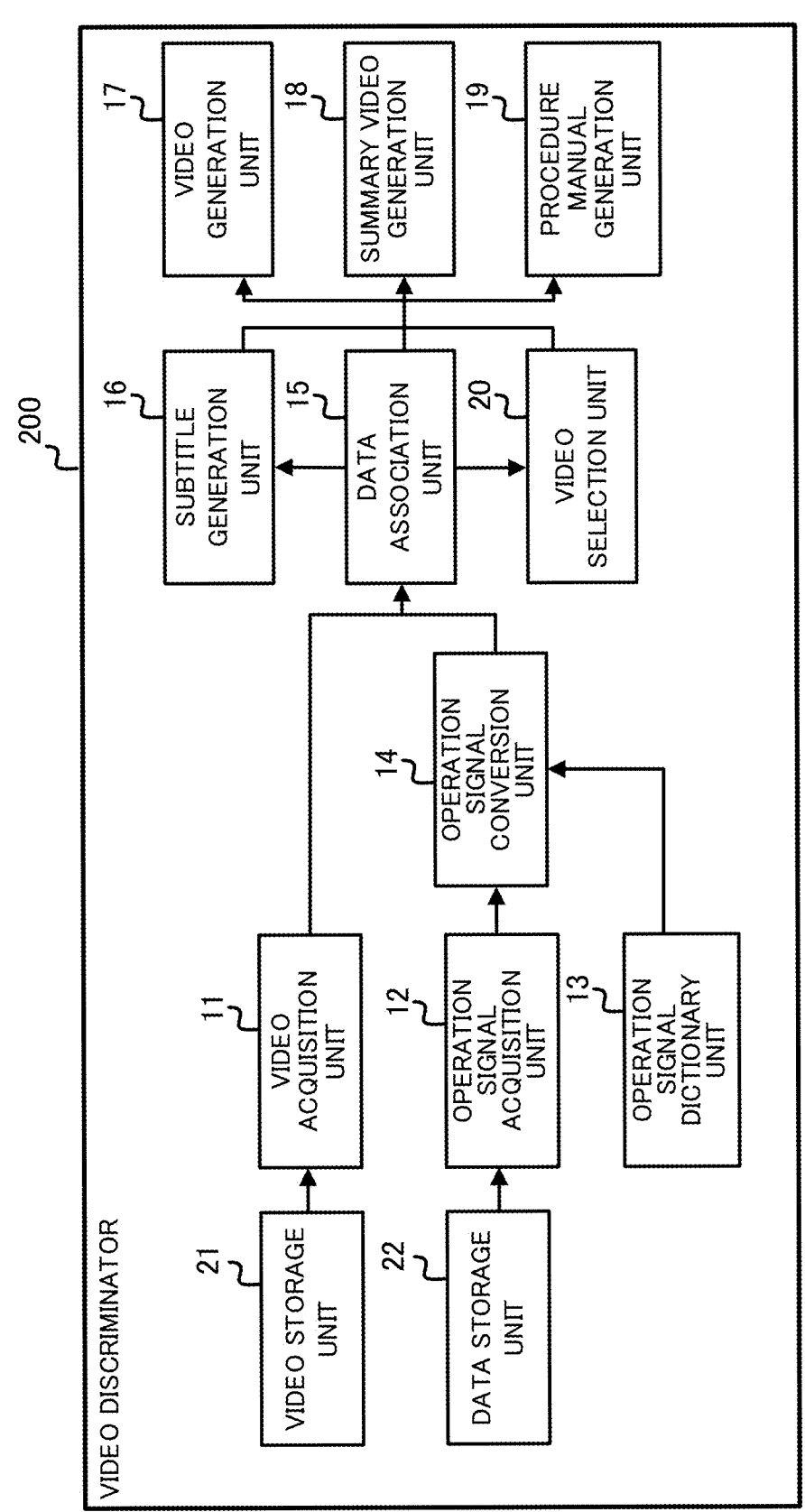
FIG. 15 is a block diagram illustrating a numerical controller according to a third disclosure.

In the second disclosure, the recording of the video and the association of data are performed simultaneously. In the third disclosure, however, association of data is performed using a video recorded during processing and an operation signal during processing. As illustrated in FIG. 15, a video discriminator 200 according to the third disclosure includes a video storage unit 21 that stores a recorded video and a data storage unit 22 that stores an operation signal which is being processed. The video acquisition unit 11 reads the video stored in the video storage unit 21, and the operation signal acquisition unit 12 reads the operation signal stored in the data storage unit 22.

The operation signal dictionary unit 13, the operation signal conversion unit 14, the data association unit 15, the subtitle generation unit 16, the video generation unit 17, the summary video generation unit 18, the procedure manual generation unit 19, and the video selection unit 20 perform the same processes as those of the second disclosure, and thus description thereof will be omitted.

The video discriminator 200 according to the third disclosure can be applied to an information processing device such as a numerical controller, a PC, a server, or a mobile terminal. The present disclosure also includes a video discrimination system in which constituents of the video discriminator 200 such as a PC, a server, and a numerical controller according to the third disclosure are distributed on a network.

Although the embodiments of the first to third discloses of the present invention have been described above, the present invention is not limited to only the examples of the above-described embodiments, and can be implemented in various modes by adding appropriate modifications.

For example, functions of the subtitle generation unit 16, the summary video generation unit 18, the procedure manual generation unit 19, and the video selection unit 20 described in the second disclosure, and the video storage unit 21 and the data storage unit 22 described in the third disclosure can be appropriately combined and used with the video discriminator according to the first disclosure. In this case, each function generates subtitles, a summary, a procedure manual, a representative video and stores data based on not only operation content but also data indicating various states of the machine.

In the first to third disclosures, the numerical controller 100 is an application example of the video discriminator. However, when the video acquisition unit 1 (the video acquisition unit 11), the machine state acquisition unit 2 (the operation signal acquisition unit 12), the machine state dictionary unit 3 (the operation signal dictionary unit 13), the machine state conversion unit 4 (the operation signal conversion unit 14), and the data association unit 5 (the data association unit 15) are included, the numerical controller may be applied to an information processing device other than the numerical controller 100. The present disclosure also includes a video discrimination system in which constituents of the numerical controller 100 are distributed to a personal computer (PC), a server, a numerical controller, and the like on a network.

Hardware Configuration

Figure 16:
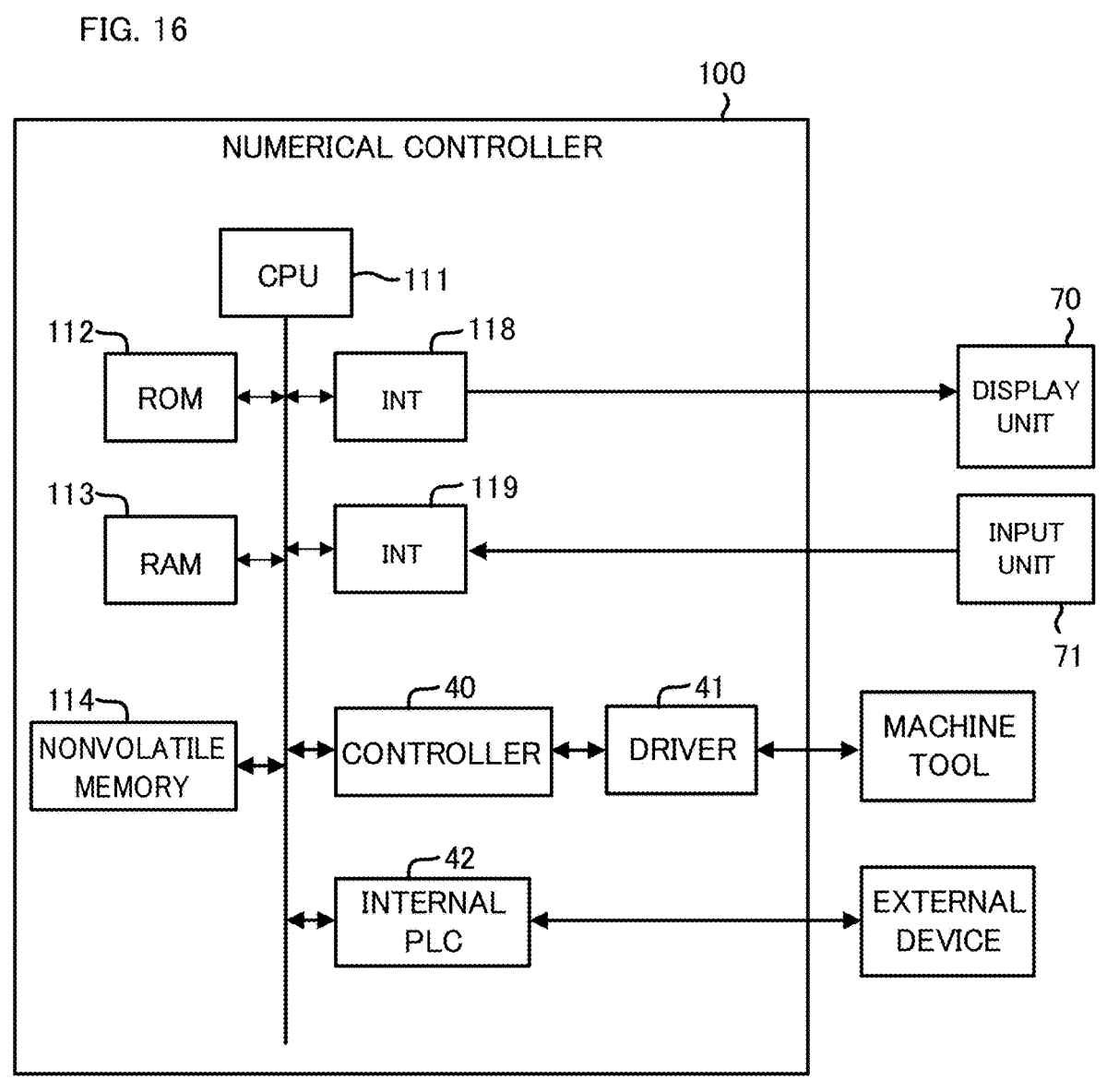

A hardware configuration of the numerical controller 100 according to the first disclosure will be described with reference to FIG. 16. The video discriminators 200 according to the second and third disclosures also have substantially the same hardware configuration. The CPU 111 included in the numerical controller 100 is a processor that controls the numerical controller 100 as a whole. The CPU 111 reads a processed system program to the ROM 112 via a bus, and controls the entire numerical controller 100 in accordance with the system program. The RAM 113 temporarily stores temporary calculation data, display data, various types of data input by the user via the input unit 71, and the like.

The display unit 70 is a monitor or the like attached to the numerical controller 100. The display unit 70 displays an operation screen, a setting screen, and the like of the numerical controller 100.

The input unit 71 is a keyboard, a touch panel, or the like integrated with the display unit 70 or different from the display unit 70. A user operates the input unit 71 to perform an input into a screen displayed on the display unit 70 or the like. The display unit 70 and the input unit 71 may be mobile terminals.

A nonvolatile memory 114 is, for example, a memory that is backed up by a battery (not illustrated) or the like and keeps a storage state even when a power supply of the numerical controller 100 is turned off. The nonvolatile memory 114 stores a program read from an external device via an interface (not illustrated), a program input via the input unit 71, and various types of data (for example, setting parameters acquired from a machine tool, and the like) acquired from each unit of the numerical controller 100, the machine tool, or the like. The programs and various types of data stored in the nonvolatile memory 114 may be loaded to the RAM 113 at the time of execution/use. Various system programs are written in the ROM 112 in advance.

The controller 40 that controls a tool of the machine tool converts an axis movement command from the CPU 111 into a pulsed signal and outputs the pulsed signal to the driver 41. The driver 41 converts the pulsed signal into a current to drive a servo motor of the machine tool. The servomotor moves a tool or a table under the control of the numerical controller 100.

REFERENCE SIGNS LIST

100 Numerical controller
200 Video discriminator
1 Video acquisition unit

2 Machine state acquisition unit
3 Machine state dictionary unit
4 Machine state conversion unit
5 Data association unit
11 Video acquisition unit
12 Operation signal acquisition unit
13 Operation signal dictionary unit
14 Operation signal conversion unit
15 Data association unit
16 Subtitle generation unit
17 Video generation unit
18 Summary video generation unit
19 Procedure manual generation unit
20 Video selection unit
111 CPU
112 ROM
113 RAM
114 Nonvolatile memory

The invention claimed is:

1. A video discriminator comprising:
   a machine state dictionary unit configured to associate identification information of data related to a state of a machine which is both or at least one of a numerical controller and a machine tool with content of the data;
   a video acquisition unit configured to acquire a video of the machine;
   a machine state acquisition unit configured to acquire data used to detect a change in a state of the machine;
   a machine state conversion unit configured to detect the change in the state of the machine based on the data and convert the change in the data into content of the data with reference to the machine state dictionary unit; and
   a data association unit configured to associate a video at a time point of the change in the state of the machine with content of the data.

2. The video discriminator according to claim 1, wherein the data association unit associates the video at a time point of the change in the state of the machine with a value of the data.

3. The video discriminator according to claim 1, wherein the video at a time point of the change in the state of the machine is both or at least one of a video of the machine captured by a camera and a captured video of an operation screen of the numerical controller.

4. The video discriminator according to claim 1, wherein the data used to detect the change in the state of the machine includes at least one of an operation signal of an operator, a change in a variable by a processing program, a change in a variable from an embedded program, a change in a variable from an information processing device, an input signal from an external device connected to the machine tool, an output signal to an external device connected to the machine tool, a processing program command, or a sequence program command.

5. The video discriminator according to claim 1, wherein the content of the data is at least one of a text format, a video format, or an audio format.

6. The video discriminator according to claim 1, wherein a subtitle at a time point of the change in the state of the machine is generated from content of the data in the text format.

7. The video discriminator according to claim 1, wherein content of data in the video format is a video indicating an operation on an input unit of the numerical controller at the time point of the change in the state of the machine.

8. The video discriminator according to claim 1, wherein the video at the time point of the change in the state of the machine is a key frame.

9. The video discriminator according to claim 1, further comprising:

a summary video generation unit configured to extract videos at time points of changes in states of the machine and generate a summary video by joining the extracted videos.

10. The video discriminator according to claim 1, further comprising:

a procedure manual generation unit configured to generate a procedure manual of processing using the video at the time point of the change in the state of the machine and content of the video.

11. The video discriminator according to claim 1, further comprising:

a video selection unit configured to receive a selection of at least one of videos at time points of changes in the data and set the selected video as a representative video.

12. The video discriminator according to claim 1, wherein the machine state dictionary unit associates an operation signal serving as data used to detect a change in a state of the machine and input to the numerical controller with operation content of the numerical controller serving as content of the data, wherein the video acquisition unit acquires a video at a time point of an operation on the numerical controller, wherein the machine state acquisition unit acquires an operation signal input to the numerical controller at the time point of the operation, wherein the machine state conversion unit detects a change in the operation signal and converts the change in the operation signal into operation content of the numerical controller with reference to the machine state dictionary unit, and wherein the data association unit selects a video at a time point of a change in the operation signal and associates the video with the operation content.

13. A video discrimination system comprising:

a machine state dictionary unit configured to associate identification information of data related to a state of a machine which is both or at least one of a numerical controller and a machine tool with content of the data;

a video acquisition unit configured to acquire a video of the machine;

a machine state acquisition unit configured to acquire data used to detect a change in a state of the machine; and a data association unit configured to detect the change in the state of the machine based on the data and convert the change in the data into operation content of the machine with reference to the machine state dictionary unit and to associate a video at a time point of the change in the state of the machine with content of the data.

14. A non-transitory storage medium storing a computer-readable instruction, wherein one or a plurality of processors performs the computer-readable instruction to perform:

storing a machine state dictionary unit that associates identification information of data related to a state of a machine which is both or at least one of a numerical controller and a machine tool with content of the data;

acquiring a video of the machine;

acquiring data used to detect a change in a state of the machine;

determining whether the state of the machine has changed based on the data; and associating a video at a time point of the change in the state of the machine with content of the data.

* * * * *